(12) United States Patent
Darabi et al.

(10) Patent No.: US 12,274,382 B2
(45) Date of Patent: Apr. 15, 2025

(54) AUTOMATED PRODUCT CABINET FOR INVENTORY CONTROL

(71) Applicant: LensLogix, Inc., Jacksonville, FL (US)

(72) Inventors: Hamid Anthony Darabi, Jacksonville, FL (US); James M. Scolaro, Jacksonville, FL (US); Jessica A. Richey, Jacksonville, FL (US); Charles H. Bloodworth, III, Jacksonville, FL (US)

(73) Assignee: LensLogix, Inc., Jacksonville, FL (US)

( * ) Notice: Subject to any disclaimer, the term of this patent is extended or adjusted under 35 U.S.C. 154(b) by 0 days.

(21) Appl. No.: 18/205,888

(22) Filed: Jun. 5, 2023

(65) Prior Publication Data

US 2024/0398137 A1    Dec. 5, 2024

(51) Int. Cl.
| | |
|---|---|
| *A47F 7/02* | (2006.01) |
| *A47B 67/04* | (2006.01) |
| *A47B 88/477* | (2017.01) |
| *A47B 88/919* | (2017.01) |
| *A47B 88/975* | (2017.01) |
| *A47B 88/988* | (2017.01) |
| *G06Q 10/087* | (2023.01) |

(52) U.S. Cl.
CPC ............ *A47F 7/021* (2013.01); *A47B 88/477* (2017.01); *A47B 88/919* (2017.01); *A47B 88/975* (2017.01); *G06Q 10/087* (2013.01); *A47B 67/04* (2013.01); *A47B 88/988* (2017.01)

(58) Field of Classification Search
CPC ................. A47B 88/969; A47B 88/975; A47B 2088/976; A47B 2088/977; A47B 88/981; A47B 88/988; A47B 88/994; G06Q 10/087; B65D 5/48038
See application file for complete search history.

(56) References Cited

U.S. PATENT DOCUMENTS

| | | | | |
|---|---|---|---|---|
| 2,268,637 | A | * | 1/1942 | Bernstein ............. A47B 88/994 428/116 |
| 2,673,656 | A | * | 3/1954 | Cunningham ..... B65D 5/48038 217/32 |
| 5,584,400 | A | * | 12/1996 | Feinbloom ............... A47F 7/021 211/85.1 |

(Continued)

FOREIGN PATENT DOCUMENTS

EP    1122194 B1    11/2004

*Primary Examiner* — Florian M Zeender
*Assistant Examiner* — Vanessa Deligi
(74) *Attorney, Agent, or Firm* — Bold IP PLLC

(57) ABSTRACT

An automated cabinet. The automated cabinet includes an inventory management system. The inventory management system keeps an inventory of a storage cabinet and send and receive electrical communications to and from the storage cabinet. The automated cabinet also includes the storage cabinet. The storage cabinet includes a housing and one or more drawers configured to be slidably stowable within the housing. Each of the one or more drawers includes a series of horizontal dividers and a series of vertical dividers, where each of the vertical dividers is mated with one or more of the horizontal dividers, creating one or more configurable slots within the drawer. The storage cabinet also includes one or more PCBs. Each PCB is in electronic communication with the inventory management system and is connected to a drawer light and one or more slot lights.

18 Claims, 11 Drawing Sheets

(56) References Cited

U.S. PATENT DOCUMENTS

| | | | | |
|---|---|---|---|---|
| 5,651,596 A * | 7/1997 | Carlson | | A47B 88/994 |
| | | | | 312/334.32 |
| 6,349,904 B1 * | 2/2002 | Polad | | F16L 3/137 |
| | | | | 248/74.3 |
| 6,385,505 B1 | 5/2002 | Lipps | | |
| 7,537,155 B2 * | 5/2009 | Denenberg | | B65G 1/127 |
| | | | | 235/382 |
| 8,392,018 B2 | 3/2013 | Wang et al. | | |
| 8,554,364 B2 | 10/2013 | Holmes et al. | | |
| 8,694,154 B2 | 4/2014 | Winkler | | |
| 8,700,210 B2 | 4/2014 | Bufalini et al. | | |
| 9,122,783 B2 | 9/2015 | Carson et al. | | |
| 9,129,245 B2 | 9/2015 | Chudy et al. | | |
| 9,282,885 B2 | 3/2016 | Tamsot | | |
| 10,109,145 B2 | 10/2018 | Kernick et al. | | |
| 10,358,247 B2 | 7/2019 | Chudy et al. | | |
| 10,453,292 B2 | 10/2019 | Kernick et al. | | |
| 10,650,921 B2 | 5/2020 | Chudy et al. | | |
| 11,263,581 B2 | 3/2022 | Reid | | |
| 11,503,910 B1 * | 11/2022 | Carmen | | A47B 88/975 |
| 2004/0104652 A1 * | 6/2004 | Holmes | | E05B 65/0003 |
| | | | | 312/348.3 |
| 2008/0202976 A1 * | 8/2008 | Burgess | | A47B 88/994 |
| | | | | 206/557 |
| 2011/0054927 A1 * | 3/2011 | Renna | | G07F 11/004 |
| | | | | 705/28 |
| 2011/0084584 A1 * | 4/2011 | Curtin | | A47B 97/00 |
| | | | | 312/348.3 |
| 2012/0251064 A1 * | 10/2012 | Crain | | G02B 6/4472 |
| | | | | 385/135 |
| 2016/0343214 A1 * | 11/2016 | Chap | | F21V 33/00 |
| 2017/0036859 A1 | 2/2017 | Lopes Ribeiro | | |
| 2018/0144574 A9 | 5/2018 | Renna et al. | | |
| 2018/0198984 A1 * | 7/2018 | Palma | | H04N 5/272 |
| 2018/0344029 A1 * | 12/2018 | Miles | | A47B 88/975 |
| 2019/0311316 A1 | 10/2019 | Kernick et al. | | |
| 2020/0063955 A1 * | 2/2020 | Weir | | F21V 23/0471 |
| 2020/0364648 A1 | 11/2020 | Kernick et al. | | |
| 2020/0364650 A1 * | 11/2020 | Kernick | | G06K 7/1413 |

* cited by examiner

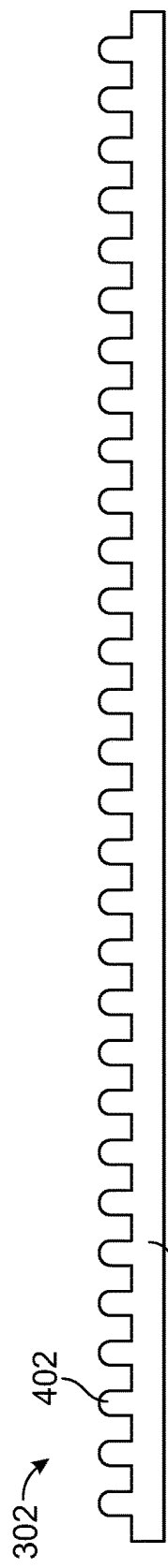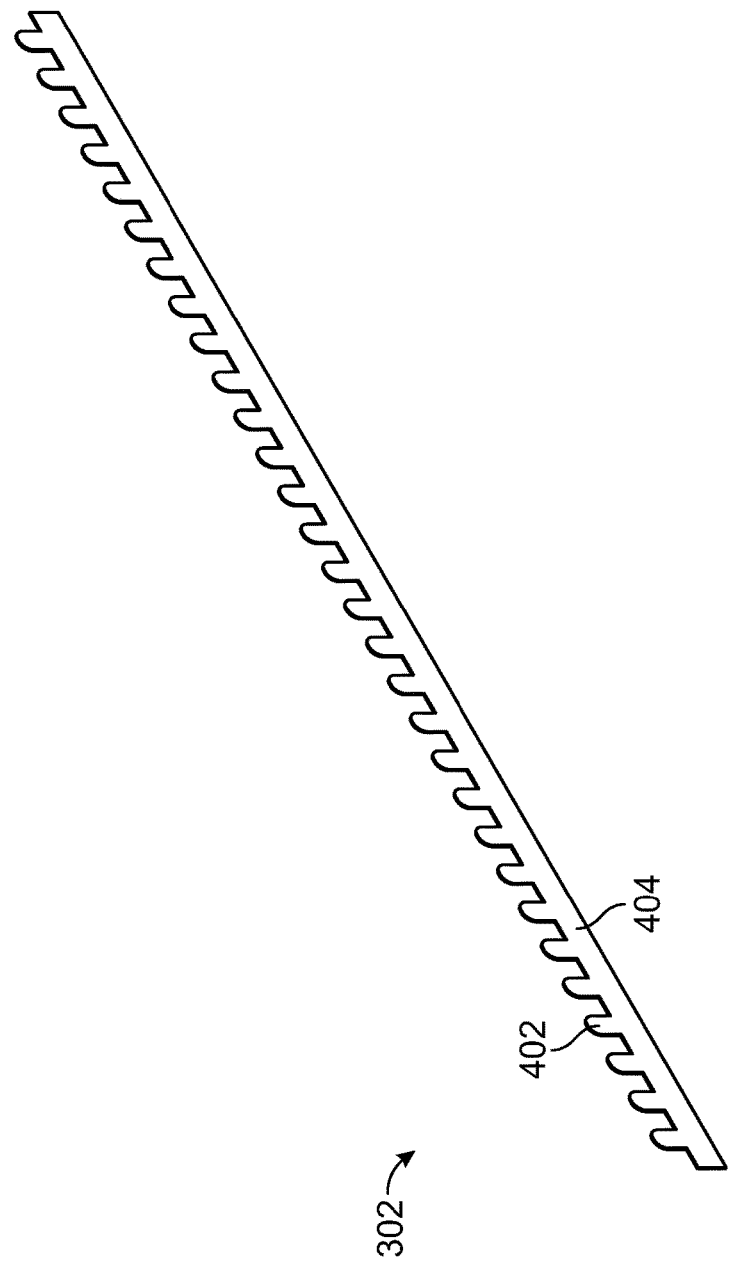
FIG. 4A
FIG. 4B

AUTOMATED PRODUCT CABINET FOR INVENTORY CONTROL

CROSS-REFERENCE TO RELATED APPLICATION

This application is related to a co-pending U.S. patent application Ser. No. 18/205,910 which was filed on Jun. 5, 2023, which is incorporated herein by reference in its entirety.

FIELD OF THE DISCLOSURE

This present disclosure generally relates to storage and inventory control.

BACKGROUND

The present disclosure relates to automated product lockers and cabinets for various items including ophthalmic lenses, and more particularly to systems to dispense ophthalmic objects, record and track patient information, determine different lenses for patients, and to track and control inventory of ophthalmic lenses in the offices of eye care professionals.

In a typical office of an eye care professional, or ECP, many different ophthalmic lenses are kept in inventory in order to dispense to a patient that enters the office. Typically, a patient will have his or her eyes examined to determine if corrective lenses are necessary and, whether the patient desires contact lenses, for example. In order to dispense such lenses, the ECP will keep many lenses in stock in the office in order to first test whether a specific lens is appropriate and to give the patient a sufficient quantity until a complete order can be sent. Additionally, in a surgical setting, many different intraocular lenses are kept in inventory in order to dispense to a patient undergoing surgery. Likewise, an ECP needs to keep a number of spectacle lenses in stock in order to allow a patient to decide on lens type, frame type, etc.

Manual and automated dispensing machines are known and utilized for dispensing a wide variety of items ranging from snacks and hot meals to health-related items such as certain over-the-counter medications. The vast majority of these dispensing machines are vending machines that are utilized as point-of-sale devices. While dispensing and vending machines are utilized in many areas, they are not widely used in the health care market. In the field of eye care, for example, eye care professionals still dispense trial contact lenses from drawers or display units manually stocked by themselves and sales representatives of the lens manufacturers. These drawers typically don't include any kind of inventory system, with ophthalmic lenses placed in any available spot which is big enough to hold the ophthalmic lenses. This means that there is no system to track the location of the ophthalmic lenses and trace which lenses have been used. Different stock keeping units, or SKUs, need to be segregated by attributes such as refractive power; wear regimen such as daily, weekly, bi-weekly, or monthly wear; lens manufacturer; and lens material. This necessarily requires the use of many drawers that are not completely full in order to keep track of what is in inventory and to more easily locate a lens of choice when a physician selects for a patient. Similarly, in the surgical setting, intraocular lenses are dispensed from manually stocked and inventoried storage locations. Likewise, spectacle lenses are manually stocked and the storage system tends to be randomly arranged. Finally, there is no way for an ECP to know when an ophthalmic lens has expired or needs to be replaced.

There exists a need, however, for systems that may be utilized by eye health care professionals as a tool to assist such professionals with a means and method for providing the patient with real time access to a wide variety of ophthalmic lenses (e.g., contact lenses, intraocular lenses, or spectacle lenses) in a timely manner. Such machines could also be used to better manage the large number of lenses and growing number of SKUs that need to be kept in stock with automated inventory control. Such machines and systems would also be used by manufacturers of such lenses to provide immediate access to those lenses which fit the needs of each particular, individual patient based on inventory and management systems. Further, there is a need to develop a system for stocking the lenses and allowing a user to easily retrieve the ophthalmic lenses when desired. In addition, the system can deliver product information to conduct data analytics to better provide new products that better meet such patients' needs. Moreover, the system can alert an ECP when ophthalmic lenses are about to expire or have expired and will need to be reordered.

Embodiments of the present disclosure provide devices and methods that address the above clinical needs.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an automated cabinet. The automated cabinet includes an inventory management system. The inventory management system includes a controller, the controller comprising a processor and a memory. The memory having computer-executable instructions stored thereon that, when executed by the processor, cause the controller to keep an inventory of a storage cabinet and send and receive electrical communications to and from the storage cabinet. The automated cabinet also includes the storage cabinet. The storage cabinet includes a housing and one or more drawers configured to be slidably stowable within the housing. Each of the one or more drawers defining a storage area configured to receive a product. Each of the one or more drawers including a series of horizontal dividers, where each horizontal divider of the series of horizontal dividers is aligned side to side within the drawer and a series of vertical dividers, where each of the vertical dividers is aligned front to back within the drawer and mated with one or more of the horizontal dividers of the series of horizontal dividers, creating one or more slots within the drawer which are configurable for different sizes and shapes of product. The storage cabinet also includes one or more printed circuit boards. Each printed circuit board of the one or more printed circuit boards is in electronic communication with the inventory management system. Each printed circuit board is also electronically connected to a drawer light in each drawer of the one or more drawers and one or more slot lights, where the one or more slot lights are configured to indicate respective positions of the one or more slots created by series of horizontal dividers and the one or more series of vertical dividers within the drawer.

Another example embodiment includes an automated cabinet. The automated cabinet includes an inventory management system. The inventory management system includes a controller, the controller comprising a processor and a memory. The memory having computer-executable instructions stored thereon that, when executed by the processor, cause the controller to keep an inventory of a storage cabinet and send and receive electrical communications to and from the storage cabinet. The automated cabinet also includes the storage cabinet. The storage cabinet includes a housing and one or more drawers configured to be slidably stowable within the housing. Each of the one or more drawers defining a storage area configured to receive a product. Each of the one or more drawers including a series of horizontal dividers, where each horizontal divider of the series of horizontal dividers is aligned side to side within the drawer and a series of vertical dividers, where each of the vertical dividers is aligned front to back within the drawer and mated with one or more of the horizontal dividers of the series of horizontal dividers, creating one or more slots within the drawer which are configurable for different sizes and shapes of product. The storage cabinet also includes one or more printed circuit boards. Each printed circuit board of the one or more printed circuit boards is in electronic communication with the inventory management system. Each printed circuit board is also electronically connected to a drawer light in each drawer of the one or more drawers and one or more slot lights, where the one or more slot lights are configured to indicate respective positions of the one or more slots created by series of horizontal dividers and the one or more series of vertical dividers within the drawer. The automated cabinet further includes one or more communication wires, each communication wire carrying an electrical communication between one of the printed circuit boards and the electronically connected drawer light in each drawer of the one or more drawers and one or more slot lights.

Another example embodiment includes an automated cabinet. The automated cabinet includes an inventory management system. The inventory management system includes a controller, the controller comprising a processor and a memory. The memory having computer-executable instructions stored thereon that, when executed by the processor, cause the controller to keep an inventory of a storage cabinet and send and receive electrical communications to and from the storage cabinet. The automated cabinet also includes the storage cabinet. The storage cabinet includes a housing and one or more drawers configured to be slidably stowable within the housing. Each of the one or more drawers defining a storage area configured to receive a product. Each of the one or more drawers including a series of horizontal dividers, where each horizontal divider of the series of horizontal dividers is aligned side to side within the drawer and a series of vertical dividers, where each of the vertical dividers is aligned front to back within the drawer, mated with one or more of the horizontal dividers of the series of horizontal dividers, creating one or more slots within the drawer which are configurable for different sizes and shapes of product, and a light strip mounted on the vertical divider. The storage cabinet also includes one or more printed circuit boards. Each printed circuit board of the one or more printed circuit boards is in electronic communication with the inventory management system. Each printed circuit board is also electronically connected to a drawer light in each drawer of the one or more drawers and the light strips on each of the vertical dividers. The automated cabinet further includes one or more communication wires, each communication wire carrying an electrical communication between one of the printed circuit boards and the electronically connected drawer light in each drawer of the one or more drawers and the light strips.

These and other objects and features of the present invention will become more fully apparent from the following description and appended claims or may be learned by the practice of the invention as set forth hereinafter.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

Figure 1:
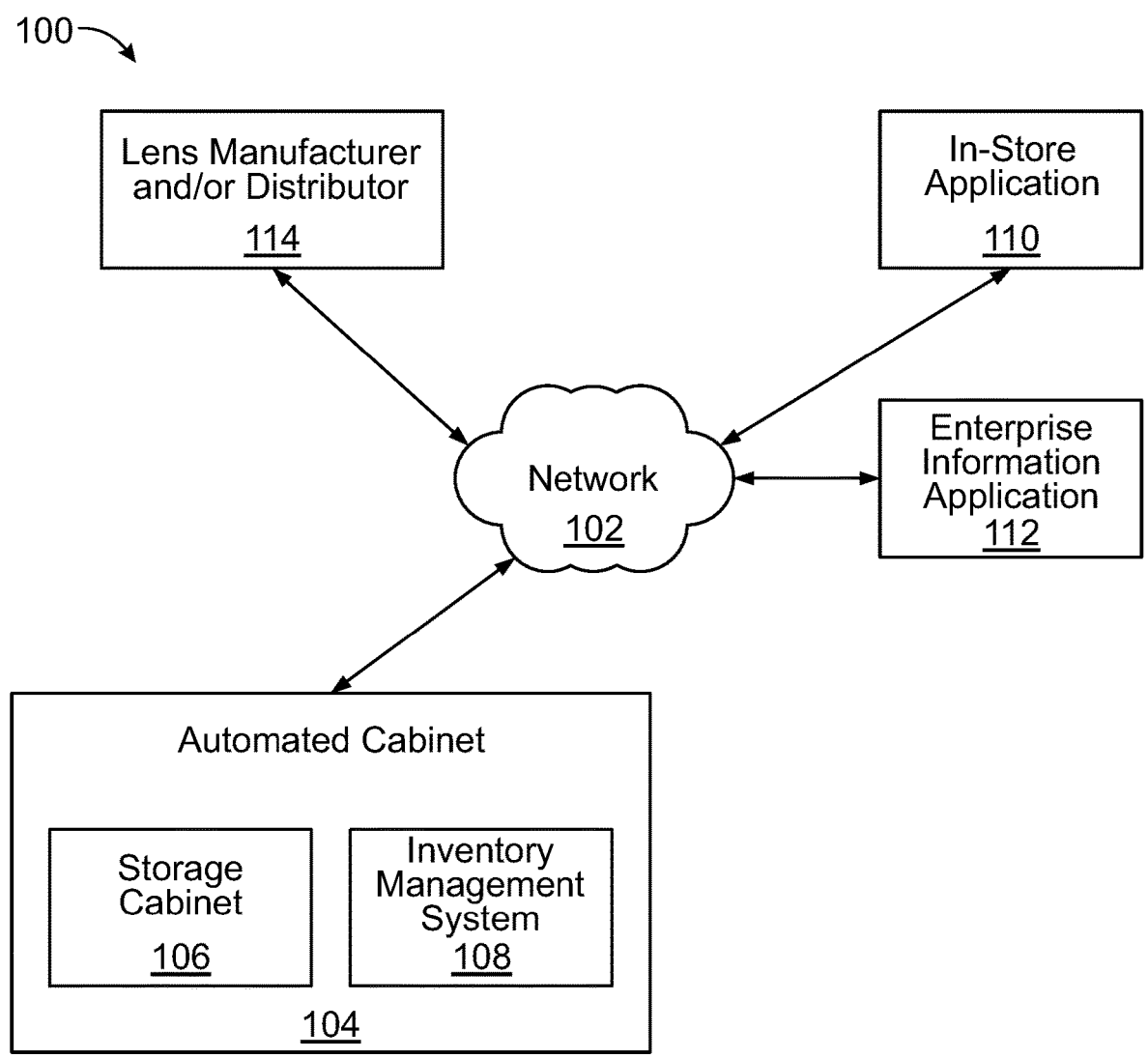
Figure 2:
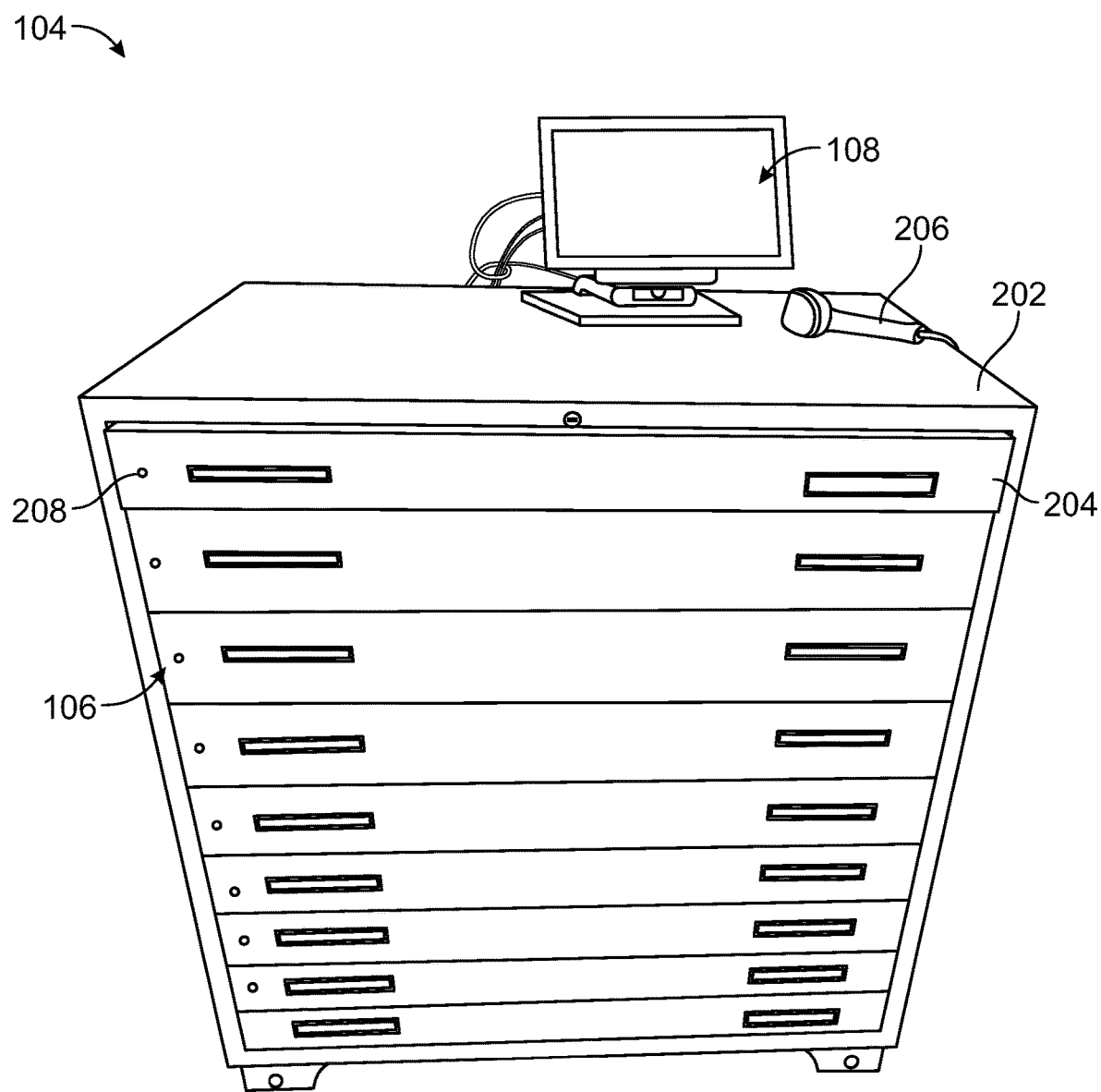
Figure 3A:
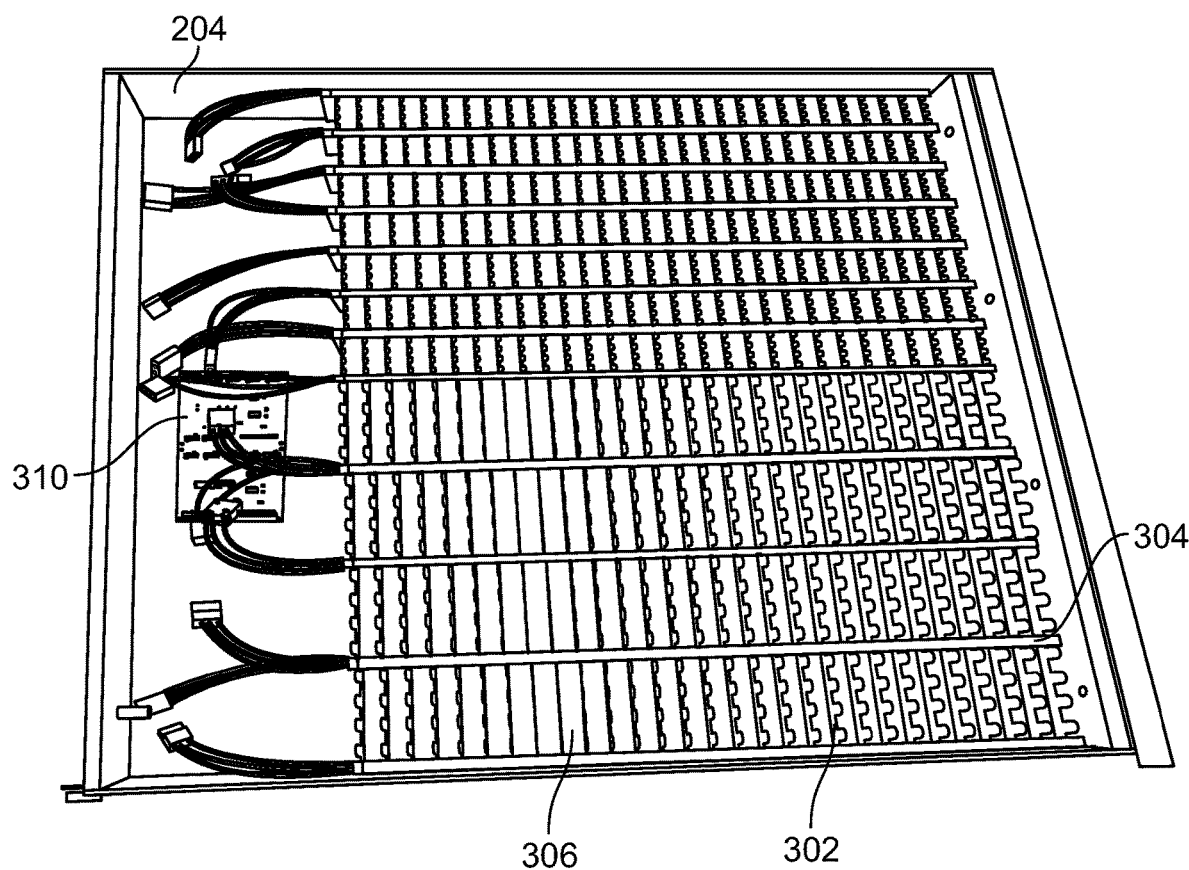
Figure 3B:
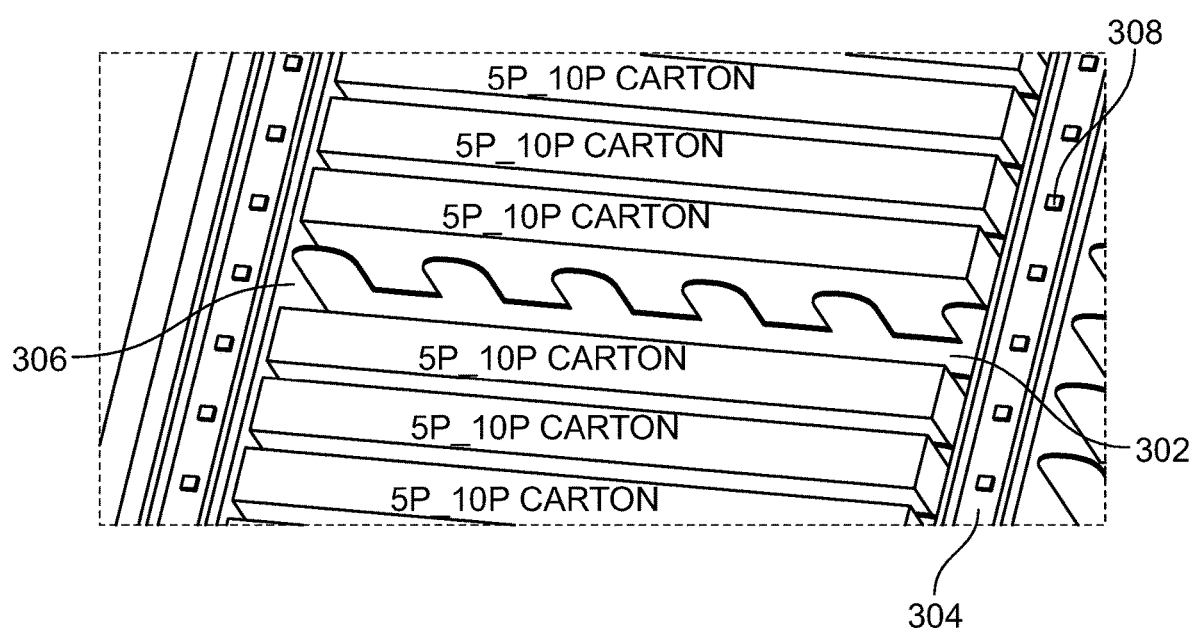
Figure 5A:
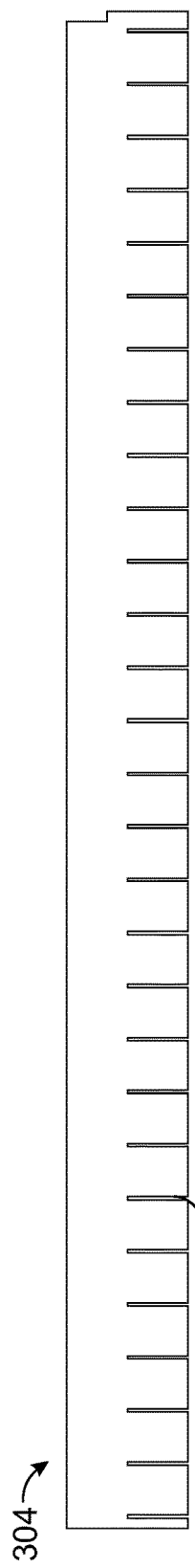
Figure 5B:
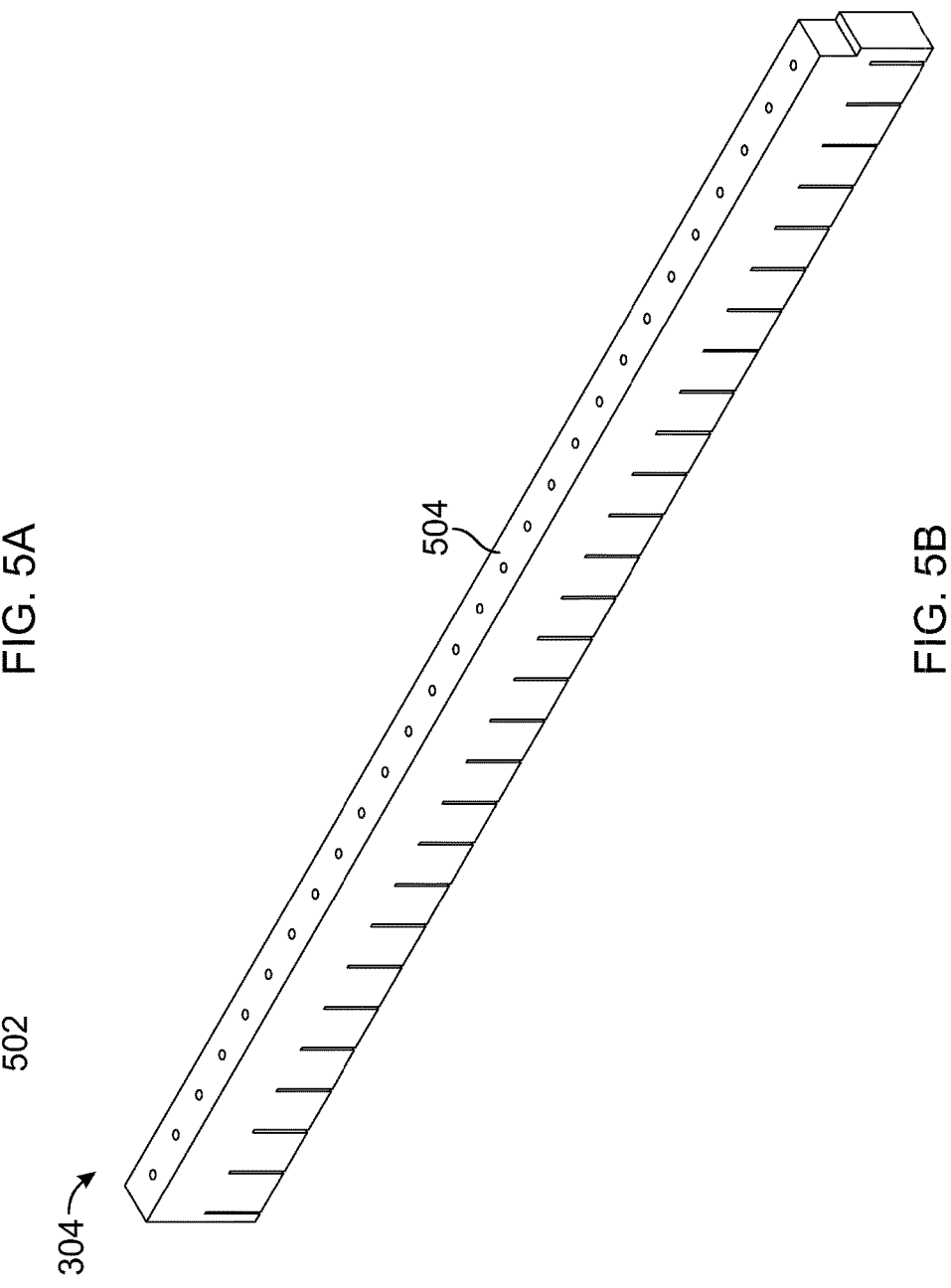
Figure 6A:
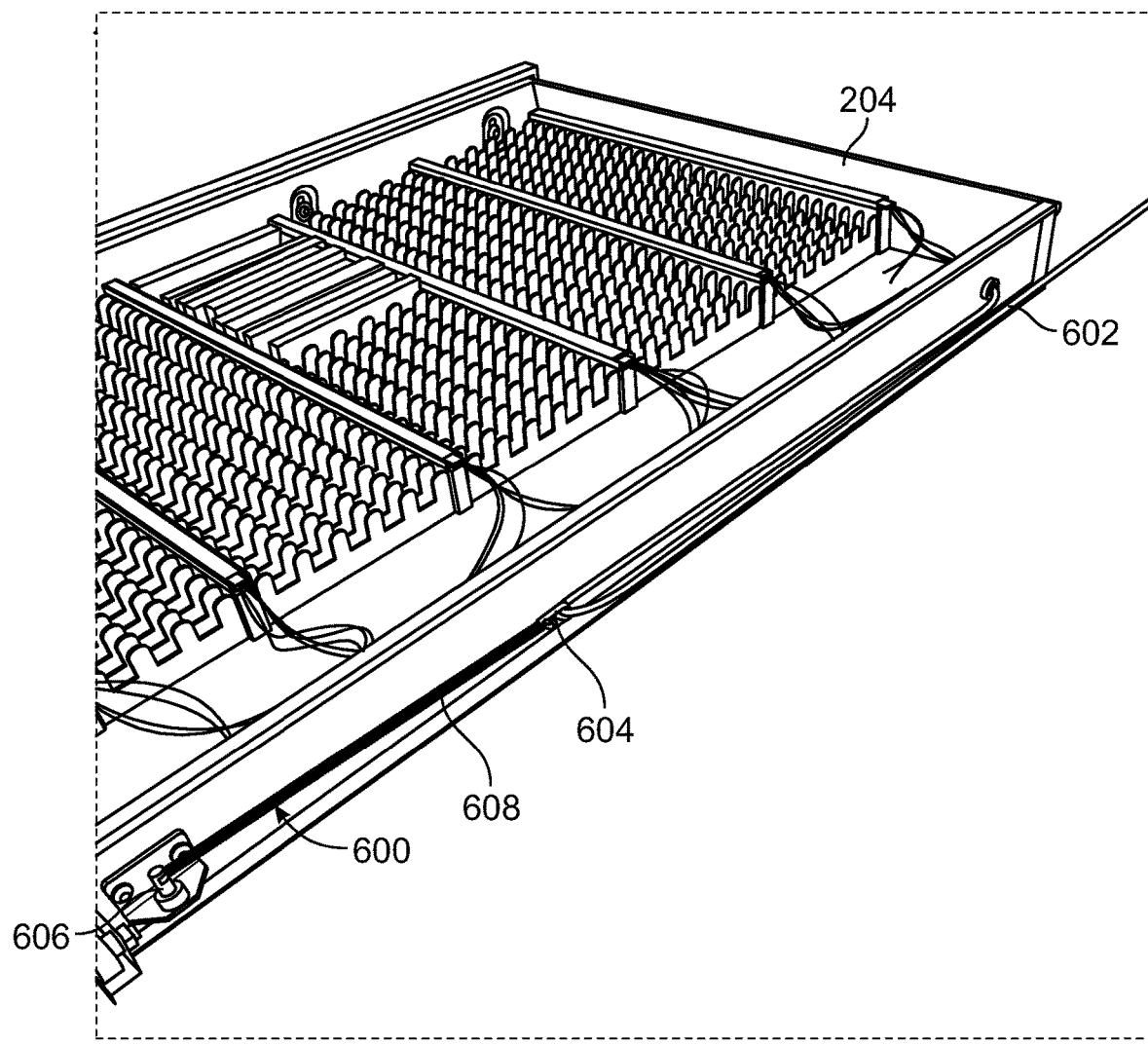
Figure 6B:
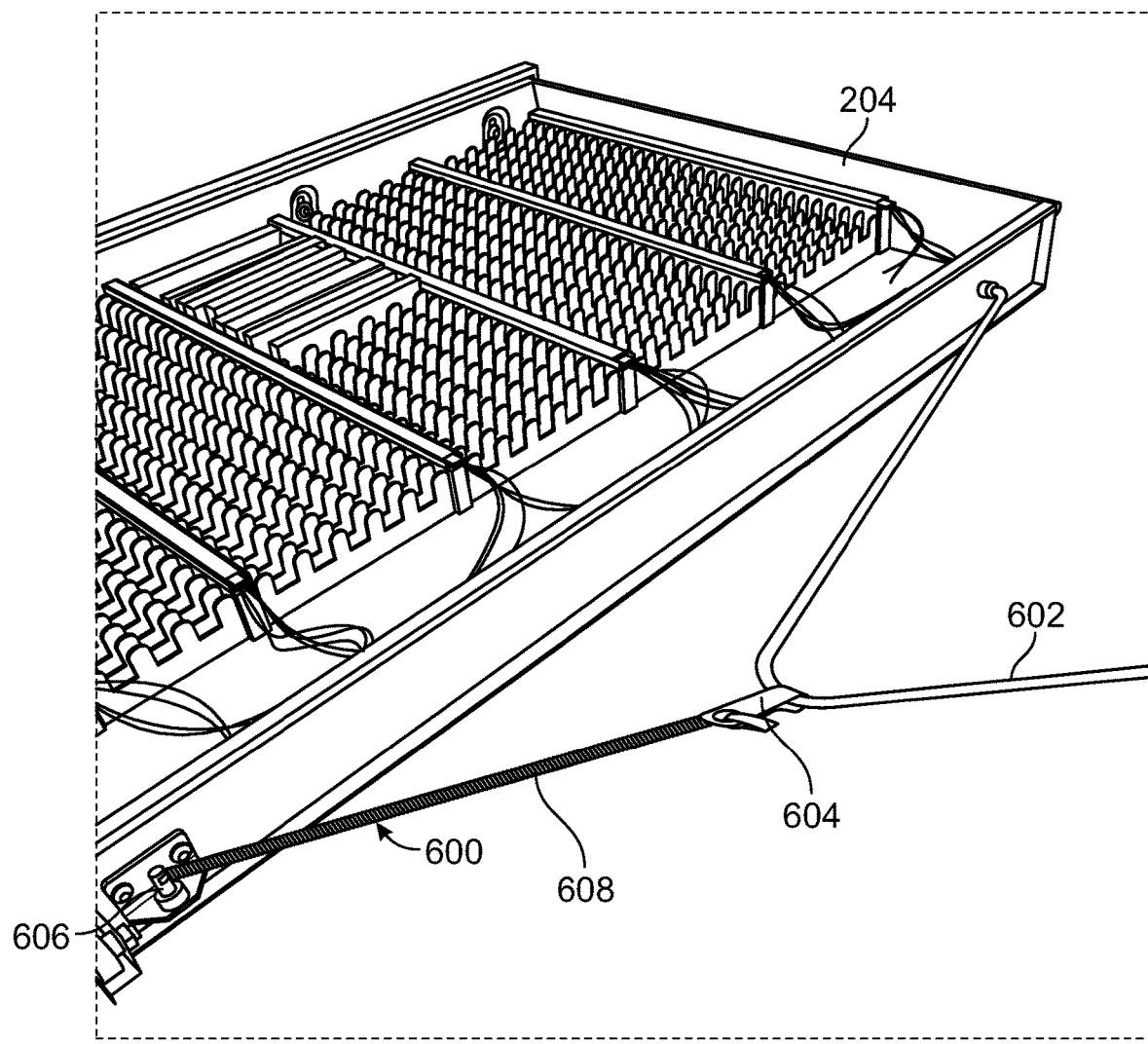
Figure 7:
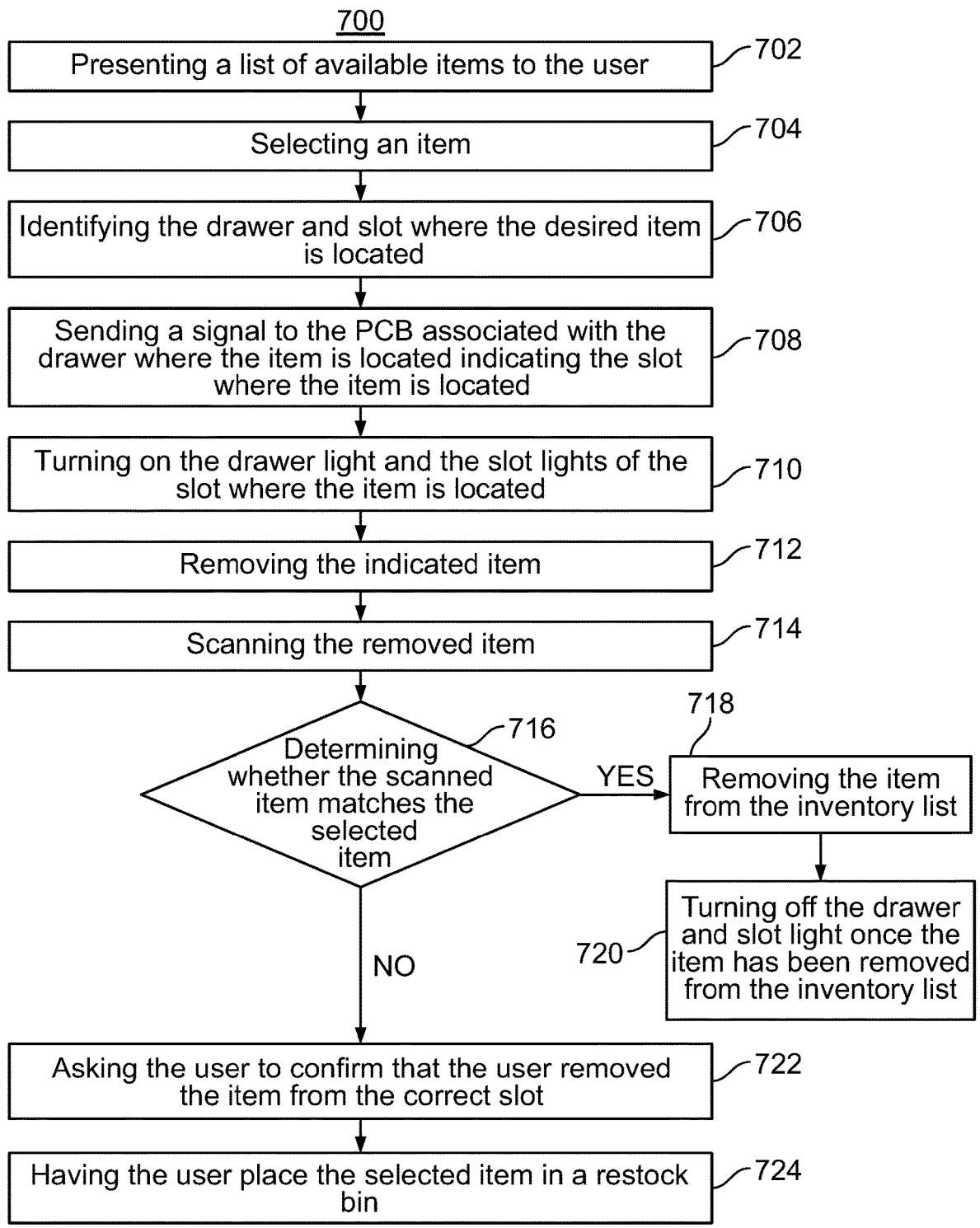
Figure 8:
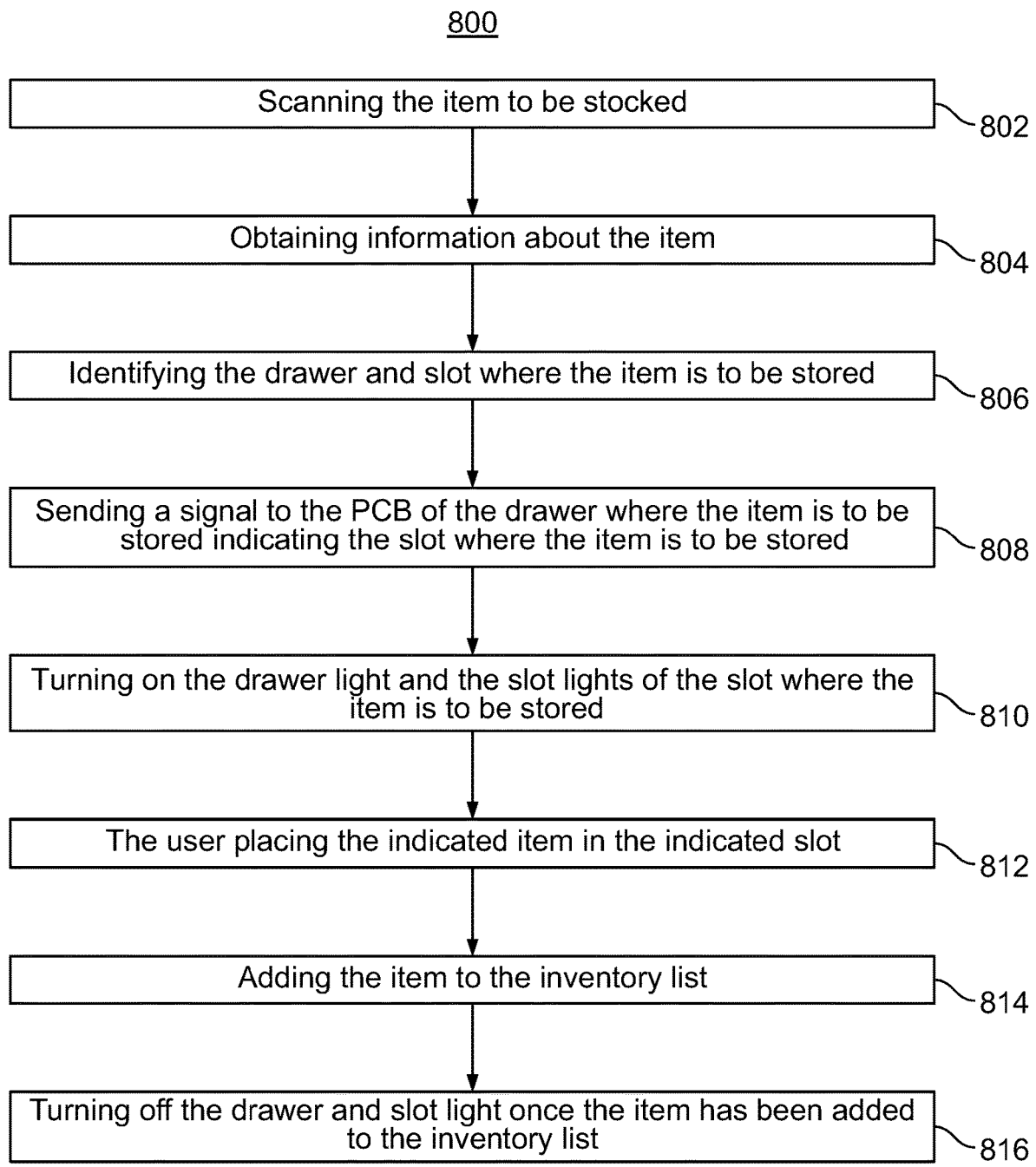
Figure 9:
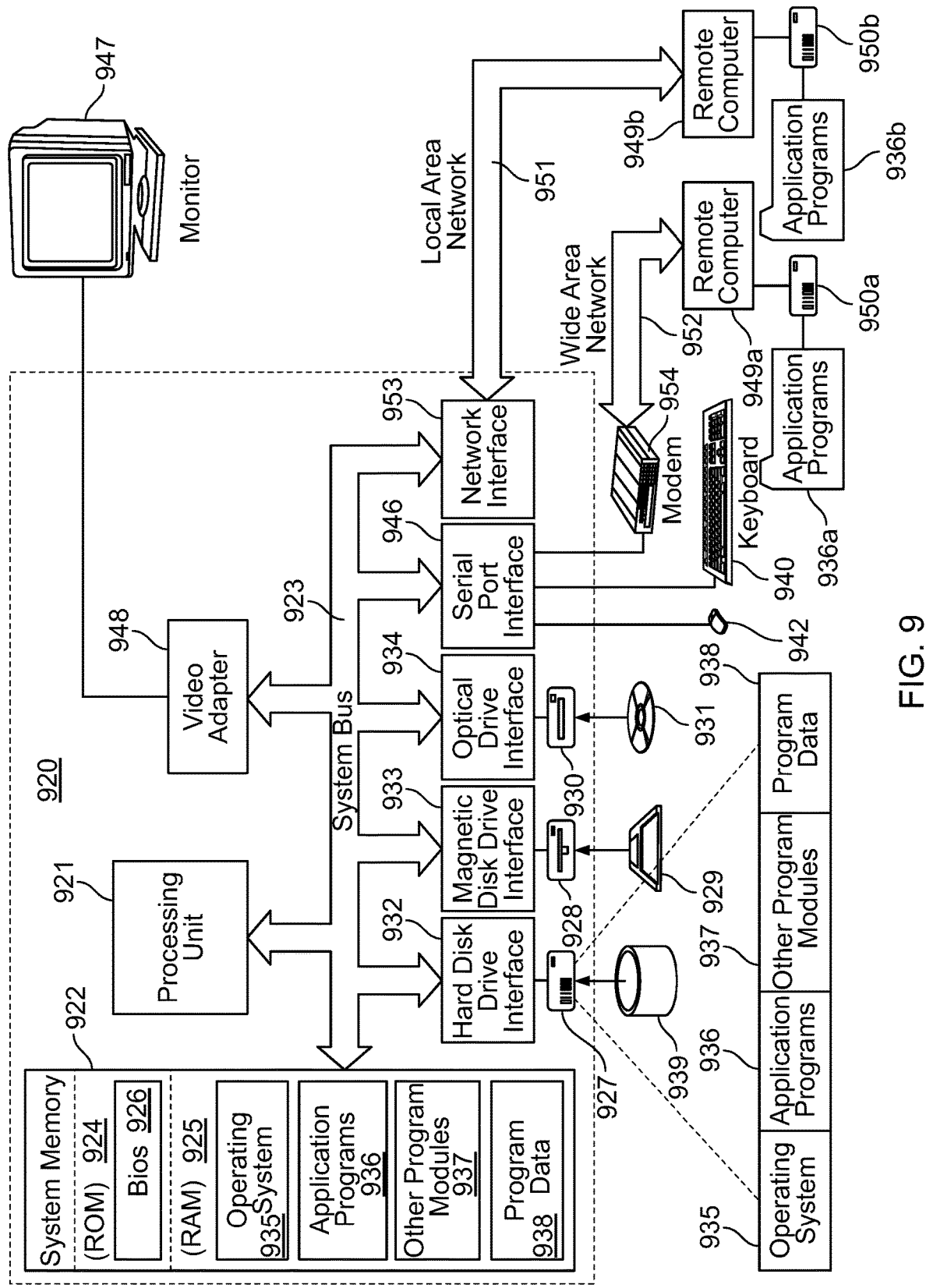

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1 is a block diagram illustrating an example of a system for product storage and inventory management;

FIG. 2 illustrates an example of an automated cabinet;

FIG. 3A illustrates a top view of the example of a drawer;

FIG. 3B illustrates a closeup view of the example of a drawer;

FIG. 4A illustrates a front view of the example of a horizontal divider;

FIG. 4B illustrates a perspective view of the example of a horizontal divider;

FIG. 5A illustrates a front view of the example of a vertical divider;

FIG. 5B illustrates a perspective view of the example of a vertical divider;

FIG. 6A illustrates an example of a wire regulator in the retracted position;

FIG. 6B illustrates an example of a wire regulator in an extended position;

FIG. 7 is a flow chart illustrating a method of a user obtaining an item from an automated cabinet;

FIG. 8 is a flowchart illustrating a method of stocking items in a system for product storage and inventory management; and FIG. 9 illustrates an example of a suitable computing environment in which the invention may be implemented.

DETAILED DESCRIPTION

Reference will now be made to the figures wherein like structures will be provided with like reference designations. It is understood that the figures are diagrammatic and schematic representations of some embodiments of the invention, and are not limiting of the present invention, nor are they necessarily drawn to scale.

FIG. 1 is a block diagram illustrating an example of a system 100 for product storage and inventory management. The system 100 can be used for storing and managing the inventory of any desired product. Ophthalmic lenses (including contact lenses, intraocular lenses and contact lenses) will be used as exemplary herein, but any other desired product can be stored and inventoried. For example, the system 100 can be used for medical supplies, medical sutures, other medical devices, nuts and bolts, other fasteners, etc.

FIG. 1 shows that the system 100 can include a network 102. In at least one implementation, the network 102 can be used to connect the various parts of the system 100 to one another. The network 102 exemplarily includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 102 includes one or more cellular RF networks and/or one or more wired and/or wireless networks such as, but not limited to, 802.xx networks, Bluetooth access points, wireless access points, IP-based networks, or the like. For example, the network 102 can include cloud-based networking and computing. The network 102 can also include servers and software that enable one type of network to interface with another type of network.

FIG. 1 also shows that the system 100 can include an automated cabinet 104. The automated cabinet stores the ophthalmic lenses and monitors the inventory of ophthalmic lenses. In addition, the automated cabinet 104 makes it easy for a user to search and locate the correct ophthalmic lenses by directing the user to the exact location of the ophthalmic lenses, as described below.

FIG. 1 further shows that the automated cabinet 104 includes a storage cabinet 106. The storage cabinet 106 physically stores the ophthalmic lenses, i.e., the ophthalmic lenses are placed in the storage cabinet 106. The storage cabinet 106 is located in proximity to the site where the ophthalmic lenses will be needed. For example, the storage cabinet 106 can be located at a site where ophthalmic lenses are sold and/or prescribed, such as the offices of eye doctors. The storage cabinet 106 has multiple locations of different sizes for storing ophthalmic lenses, as described below.

FIG. 1 additionally shows that the automated cabinet 104 can include an inventory management system 108. The inventory management system 108 maintains a list of current ophthalmic lenses stored within the storage cabinet 106 and their location within the storage cabinet 106. In addition, the inventory management system 108 updates when ophthalmic lenses are added, moved, or removed from the storage cabinet 106. The inventory management system 108 can also allow a user to see ophthalmic lenses that are present and quickly locate the contract lenses within the storage cabinet 106, allowing the user to distribute ophthalmic lenses that are in stock. Further, the inventory management system 108 can alert a user when certain ophthalmic lenses need to be reordered or have expired. I.e., the inventory management system will flag ophthalmic lenses which have or are nearing expiration for reorder. The inventory management system 108 can include an electronic database capable of electronically storing data and/or running a software application. E.g., the inventory management system 108 can include memory or memory banks. Additionally or alternatively, the inventory management system 108 can include processors or other logic devices capable of executing software or carrying out other computer algorithms.

FIG. 1 moreover shows that the system 100 can include an in-store application 110. The in-store application 110 can allow a user to access information from multiple automated cabinets. For example, if the user has multiple automated cabinets 104, the in-store application 110 can combine inventories from each of the automated cabinets 104, allowing the user a full picture of all inventory available at the site of the automated cabinets 104 or at other affiliated locations. For example, a doctor could search for a particular type of ophthalmic lens, determine whether any are at the same location, and if so, direct the doctor to the appropriate automated cabinet 104. If the desired lenses are not at the present location, the in-store application can let the doctor know where the nearest available package of the desired lenses are located (e.g., at an affiliated location in the surrounding area).

FIG. 1 moreover shows that the system 100 can include an enterprise information application 112. The enterprise information application 112 can allow a user to access information that goes beyond current inventory. For example, the enterprise information application 112 can determine trends in which lenses are most popular (i.e., most used, prescribed or preferred) and so should have a larger inventory, which demographics prefer which lenses, which lenses need to be reordered, preferred lenses for upcoming patients, upcoming promotions or rebates, current pricing, preferred retailer for doctor, etc. This allows the enterprise information application 112 to allow for situations that can't be contemplated with manual storage systems currently in use, such as allowing brands to sponsor certain distributions, maximized profitability based on pricing, etc. For example, the ECP can see that a certain brand currently has higher profitability based because the brand is offering rebates which increases the margin for the ECP.

FIG. 1 also shows that the system 100 can be in contact with lens manufacturers and/or distributors 114. This can allow the system 100 to flag lenses for reorder or even order needed lenses directly from the lens manufacturers and/or distributors 114 or can allow a user to make orders as needed. For example, the enterprise information application 112 can determine which lenses are needed based on upcoming patients and notify a user, who approves the acquisition which is then sent to the lens manufacturers and/or distributors 114 and delivered to the correct offices. The lenses are stored in an automated cabinet 104 and the inventory management system 108 is updated to reflect the addition of the lenses. When the lenses are needed by a patient, then the user is directed to the location of the lenses within the automated cabinet 104 and the inventory management system 108 is updated to reflect that the lenses have been removed.

FIG. 2 illustrates an example of an automated cabinet 104. The automated cabinet 104 allows a user to select an item in inventory and then directs the user to the location of the item. In particular, the automated cabinet 104 can allow a user to select an ophthalmic lens prescription and then quickly locates the prescription for the user. Because the automated cabinet 104 can have thousands of items stored within it, directing the user quickly is critical to getting the patient the desired prescription.

FIG. 2 shows that the automated cabinet 104 can include a housing 202. The housing 202 protects and contains the other elements of the automated cabinet 104. In addition, the housing 202 ensures that the items contained in the automated cabinet 104 are protected. For example, contact lenses are typically shipped in one of three types of packages, but the packaging tends to be small and easily damaged. By storing the contact lenses within the housing 202 of the automated cabinet 104, the lenses are protected until needed.

FIG. 2 also shows that the automated cabinet 104 can include one or more drawers 204. The one or more drawers 204 are a box-shaped container inside the housing 202 that can be pulled out horizontally to access its contents. The one or more drawers 204 create an efficient method for storing the desired items because it allows the items to be stacked horizontally without resting on one another and allows items at any level to be accessed.

FIG. 2 moreover shows that the automated cabinet 104 can include an inventory management system 108. The inventory management system 108 tracks the items stored with the automated cabinet 104 and the location of each of the items. The inventory management system 108 also tracks the items being added to and removed from the slots created by the vertical dividers 304 and the horizontal dividers 302 within the drawers 204 so that the items can be located by the user, as described below.

FIG. 2 also shows that inventory management system 108 can include an optical scanner 206, such as a bar code reader, which can be used to quickly identify items being added to or removed from the automated cabinet 104. A barcode reader or barcode scanner is an optical scanner 206 that can read printed barcodes and decode the data contained in the barcode to a computer. Like a flatbed scanner, it consists of a light source, a lens, and a light sensor for translating optical impulses into electrical signals. Additionally, nearly all barcode readers contain decoder circuitry that can analyze the barcode's image data provided by the sensor and send the barcode's content to the scanner's output port where the information is used to update the automated cabinet's 104 inventory. The barcode reader can be handheld or mounted (such that the packages are passed under the reader).

FIG. 2 moreover shows that the automated cabinet 104 can include drawer lights 208. The drawer lights 208 allow a user to be directed to the proper location of a package of ophthalmic lenses. In particular, the drawer lights 208 are in electrical communication with the inventory management system 108. When a user, such as an ECP, selects the ophthalmic lens package to be distributed, the drawer light 208 for the drawer 204 which contains the desired package turns on, directing the user to the proper drawer 204. Likewise, the proper slot within the drawer 204 will be lighted to allow a user to find the proper package, as described below.

FIGS. 3A and 3B (collectively "FIG. 3") illustrate an example of a drawer 204. FIG. 3A illustrates a top view of the example of a drawer 204; and FIG. 3B illustrates a closeup view of the example of a drawer 204. The drawer 204 is used to store items for later distribution. While ideally stock would be small to allow for a minimum of storage space and ease in finding needed ophthalmic lens packages, that does not work when needs are unknown, such as with ophthalmic lenses. I.e., it is not known which ophthalmic lenses will be distributed, because that depends on the results of eye exams and a multitude of other factors. Therefore, the drawer 204 allows for a balance between a large number of ophthalmic lenses in stock and finding the desired ophthalmic lenses quickly.

FIG. 3 shows that the drawer 204 can include horizontal dividers 302. The horizontal dividers 302 allow for increased storage front to back. In particular, the horizontal dividers 302 can allow ophthalmic lenses to be stacked front to back, where they will remain standing, allowing for a maximum amount of space to be used for the storage of ophthalmic lenses. Ophthalmic lenses of the same type (e.g., contact lenses, intraocular lenses, spectacle lenses) can come in packages of various sizes. For example, contact lenses come in packages of 1, 3 or 5, 6 or 10. Intraocular lens packages are generally thicker (require a deeper slot), and spectacle lens packages are generally thinner, with contact lenses being in between the other two. Therefore, regardless of package size, the packages can be arranged front to back.

FIG. 3 also shows that the drawer 204 can also include vertical dividers 304. The vertical dividers 304 allow many items to be stored side by side with one another. The vertical dividers 304 create many spaces within the one or more drawers 204, ensuring that the items stored within the one or more drawers 204 remain organized and do not move relative to one another. The vertical dividers 304 snap into the horizontal dividers 302, allowing for different widths, as described below. Intraocular lens packages are generally thicker (require a deeper slot), and spectacle lens packages are generally thinner, with contact lenses being in between the other two. I.e., vertical dividers 304 can be placed to accommodate packages of different sizes. For example, if the vertical dividers 304 are placed for 5 packs, then 5 packages can be stored side by side. In contrast, if the vertical dividers 304 are placed for 3 packs then 7 packages can be stored side by side and if the vertical dividers 304 are placed for 1 packs, then 15 packages can be stored side by side. Therefore, the horizontal dividers 302 and vertical dividers 304 together maximize storage capacity. One of skill in the art will also appreciate that the configuration in different drawers 204 can be different based on the placement of the vertical dividers 304.

FIG. 3 shows that the drawer 204 can include a number of slots 306 created by horizontal dividers 302 and vertical dividers 304. The slots 306 need not all be the same size, since ophthalmic lens packages are not all the same size. Each slot 306 holds a single package of ophthalmic lenses. Further, each slot 306 has a unique identifier, which means that the slot 306 and any product placed within that slot 306 can be tracked by the inventory management system.

FIG. 3 also shows that the drawer 204 has slot lights 308. The slot lights 308 identify a particular slot 306 to a user. The slot lights 308 are in electrical communication with the inventory management system 108. When the user selects a particular ophthalmic lens package to be distributed, the slot lights 308 for the slot 306 which contains the desired package turn on, directing the user to the proper slot 306. Thus, between the drawer lights and the slot lights 308, a user is able to quickly locate the desired package of ophthalmic lenses.

FIG. 3 further shows that the drawer 204 can include a printed circuit board 310 ("PCB 310"). The PCB 310 connects electronic components to one another in a controlled manner. The PCB 310 receives signals from the inventory management system and translates that signal into an output signal that will light up the correct slot lights 308. I.e., the PCB 310 translates the signal from the inventory management system into an electrical signal which will be used to light up the desired slot lights 308, identifying an ophthalmic lens package for the user. One PCB 310 can control the drawer lights and slot lights 308 of multiple drawers or all of the drawers. For example, one PCB 310 can be used to control five drawers, with two PCBs 310 being used in a 10 drawer storage cabinet. Although the PCB 310 is shown in a drawer 204 in FIG. 3, one of skill in the art will appreciate that the PCB 310 need not be placed in a storage drawer 204 or even within the automated cabinet (e.g., it could be mounted on the outside of the storage cabinet).

FIGS. 4A and 4B (collectively "FIG. 4") illustrate an example of a horizontal divider 302. FIG. 4A illustrates a front view of the example of a horizontal divider 302; and FIG. 4B illustrates a perspective view of the example of a horizontal divider 302. The horizontal divider 302 stretches across a drawer side to side. There are multiple dividers front to back in the drawer 204 creating a series of grooves into which the ophthalmic lenses packages will be inserted.

FIG. 4 shows that the horizontal divider 302 includes a series of knobs 402. The knobs 402 are approximately 0.574 inches wide with a distance of approximately 0.596 inches between adjacent knobs 402. This width is critical to ensure that the horizontal divider 402 can be used for multiple different package sizes. The above distances allow for different ophthalmic lens packages to be stored when the horizontal divider 302 is used in conjunction with vertical dividers. The height of the knobs 402 is approximately 0.75 inches. This height is critical to ensure that the knobs 402 are high enough to support the vertical divider without being too high so that the ophthalmic lens packages are removable. If the height is too small, then the knobs 402 cannot adequately support the ophthalmic lens packages; however, if the height is too large then the ophthalmic lens packages (or other stored items) are difficult to remove (as there is not enough of the package to grasp after inserted). The tops of the knobs 402 are rounded to remove sharp edges so that the user is less likely to cut or poke himself/herself. The user is likely to touch the tops of the knobs 402 when inserting or removing ophthalmic lens packages so the edges are rounded to reduce injury. As used in the specification and the claims, the term approximately shall mean that the value is within 10% of the stated value, unless otherwise specified.

FIG. 4 also shows that the horizontal divider 302 also includes a base 404. The knobs 402 protrude from the base 404. The base 404 rests on the bottom of the drawer. The base 404 is approximately 35.10 inches wide, allowing it to stretch completely across the drawer. The base 404 is approximately 0.0239 inches deep, which is 24-gauge sheet metal. The depth is critical to ensure that the base 404 is strong enough to support the vertical divider and also can mate with the vertical divider when inserted. Likewise, it is critical because it is a standard size, which makes obtaining the necessary materials easier and cheaper. The base 404 is approximately 0.75 inches tall (making the total height of the base 404 and knobs 402 approximately 1.5 inches).

FIGS. 5A and 5B (collectively "FIG. 5") illustrate an example of a vertical divider 304. FIG. 5A illustrates a front view of the example of a vertical divider 304; and FIG. 5B illustrates a perspective view of the example of a vertical divider 304. The vertical divider 304 snaps into horizontal dividers, such as the horizontal divider 302 of FIG. 4 creating a series of slots into which ophthalmic lens packages or lenses can be inserted. Multiple vertical dividers 304 are placed in a drawer creating multiple slots side by side and front to back. This allows for highly flexible and efficient storage of the ophthalmic lens packages or lenses and rapid access when needed.

FIG. 5 shows that that the vertical divider 304 can include a series of channels 502. The channels 502 are approximately 0.039 inches (1 mm) wide. The width of the channels 502 is critical to allow the vertical divider to mate with the horizontal divider. The width of the channels 502 is critical to allow the 24-gauge sheet metal of the horizontal divider to be inserted into the channels 502. The distance between adjacent channels 502 is approximately 0.617 inches. This is critical to ensure that the slots are the proper depth to receive a package of ophthalmic lenses. Regardless of the number of ophthalmic lenses within the package (i.e., whether the contact lens package is a 1 pack, 3 pack, 5 pack, 6 pack, or 10 pack), so the distance between the channels 502 ensures that each of the packages can be inserted. Intraocular lens packages are generally thicker (require a deeper slot), and spectacle lens packages are generally thinner, with contact lenses being in between the other two.

The height of the vertical divider is approximately 1.5 inches. This is critical to ensure that the top of the vertical divider matches the top of the horizontal divider. This prevents damage to the packages or to the user because it reduces the number of protrusions withing the drawer. Likewise, the height of the vertical divider is lower than the height of the stored ophthalmic lens packages, giving the user a portion of the package to grab when removing the package.

FIG. 5 also shows that the vertical divider 304 can include a light strip 504. The light strip has individual lights in the space between the channels 502 and is in electrical communication with a PCB (and through the PCB an inventory management system). This means that each slot will have a pair of slot lights 308 indicating the slot into which the ophthalmic lens should be inserted or from which the ophthalmic lens should be removed. This makes it easy for a user to quickly identify the proper slot for the current operation (insertion or removal).

FIGS. 6A and 6B (collectively "FIG. 6") illustrate an example of a wire regulator 600. FIG. 6A illustrates an example of a wire regulator 600 in the retracted position (the drawer 204 is in the closed position); and FIG. 6B illustrates an example of a wire regulator 600 in an extended position (the drawer 204 is in the open position). The wire regulator 600 ensures that a communication wire 602 does not get damaged as the drawer 204 is moved back and forth.

FIG. 6 shows that the drawer 204 can include a communication wire 602. The communication wire 602 carries electrical signals between the PCB and the drawer lights and the slot lights 308. This allows a user to select the desired ophthalmic lenses and have the signal sent to the drawer 204 by the PCB which will then light the drawer light and the proper slot lights 308. Likewise, the communication wire 602 can carry signals to the inventory management system.

If the communication wire 602 were simply to hang loose behind the drawer 204, then it could be pinched or rubbed by the drawer 204. Over time, this would cause damage to the communication wire 602. The wire regulator 600 allows the wire to be long enough to remain connected when the drawer 204 is fully extended and to be pulled out of the way when the drawer 204 is fully inserted into the automated cabinet.

FIG. 6 shows that the wire regulator 600 can include a wire holder 604. The wire holder 604 connects to the communication wire 602. The wire holder 604 allows the communication wire 602 to move within the wire holder 604. That is, the communication wire 602 can slide within the wire holder 604. This allows the communication wire 602 to move as needed but still be held out of the path of the drawer 204. The wire holder 604 can be a semi-circular or other shape which allows the communication wire 602 to be easily inserted into the wire holder 604. Alternatively, the wire holder 604 can include a pulley or other mechanical device.

FIG. 6 also shows that the wire regulator 600 can include an attachment point 606. The attachment point 606 is the point toward which the communication wire 602, by means of the wire holder 604, will be pulled to keep it out of the path of the drawer 204. The attachment point 606 should be at a distance from the location where the communication wire 602 enters the drawer 204. For example, the attachment point 606 can be near one side of the drawer, while the point where the communication wire 602 enters the drawer can be on the other side of the drawer 204.

FIG. 6 further shows that the wire regulator 600 can include a spring 608. The spring 608 connects the wire holder 604 to the attachment point 606. As force is placed on the communication wire 602 (because the drawer 204 is being pulled open) the spring extends, lengthening the distance between the wire holder 604 and the attachment point. When the force is removed from the communication wire 602 (because the drawer is being pushed closed) the spring retracts, decreasing the distance between the wire holder 604 and the attachment point. This allows the communication wire 602 to go from folded and almost parallel to the back edge of the drawer 204 in the retracted position of FIG. 6A to almost perpendicular to the back edge of the drawer 204 in the extended position of FIG. 6B.

FIG. 7 is a flow chart illustrating a method 700 of a user obtaining an item from an automated cabinet. The item can include any desired item stored within the automated cabinet, such as a package of ophthalmic lenses. In at least one implementation, the ophthalmic lenses are obtained from a system for product storage and management, such as the system 100 of FIGS. 1-6. Therefore, the method 700 will be described, exemplarily, with reference to the system 100 of FIGS. 1-6. Nevertheless, one of skill in the art can appreciate that the method 700 can be used with systems other than the system 100 of FIGS. 1-6. The method can be implemented in software or any other desired medium.

FIG. 7 shows that the method 700 can include the inventory management system presenting 702 a list of available items to the user. The list presented 702 is a list of items that are currently stored within the automated cabinet. The list presented 702 to the user can be searchable. I.e., the user can enter free-form text with the closes matches then presented 702 to the user as a sub-list of the total list of items. Likewise, the list presented 702 to the user can include one or more search fields, such as prescription, lens type, brand, manufacturer, wear regimen (daily, weekly, bi-weekly, monthly, etc.), etc.

FIG. 7 also shows the method 700 can include the user selecting 704 an item. The user selects 704 the item based on whatever factors the user deems necessary. For example, ophthalmic lenses may be selected based on factors such as prescription, lens type, brand, manufacturer, wear regimen (daily, weekly, bi-weekly, monthly, etc.), etc. The exact lenses desired by the user may not be in stock, so the user may select the closest possible match. In particular, the system can suggest the closest possible match-such as the same prescription and lens material from a different manufacturer. Further, spectacle prescription is different than contact lens prescription, so the software can do the conversion automatically to allow for proper spectacle lenses based on contact lens prescription and vice versa. For example, the user may find lenses of the same prescription and type, but from a different manufacturer.

FIG. 7 further shows that the method 700 can include the inventory management system internally identifying 706 the drawer and slot where the desired item is located. This will allow the inventory management system to direct the user to the correct item. There are possibly thousands of items within the automated cabinet. Currently, these aren't sorted and all, and if they are sorted then it is done on an ad hoc basis and there isn't a universal inventory system for many items, including ophthalmic lenses. Therefore, each office can have a different sorting system. Further, moving items or keeping space between items can be required to allow for additional items to be placed with current items. In contrast, no sorting is necessary in the automated cabinet, because the user will be directed to the correct storage location.

FIG. 7 additionally shows that the method 700 can include the inventory management system sending 708 a signal to the PCB associated with the drawer where the item is located indicating the slot where the item is located. This is an electronic signal sent to the PCB so that the user can be quickly directed to the correct location without any requirements by the user to reference an inventory or other list.

FIG. 7 moreover shows that the method 700 can include the PCB associated with the drawer where the item is located turning on 710 the drawer light and the slot lights of slot where the item is located. The drawer light and the slot light quickly direct the user to the slot of the selected 704 item. The drawer light and slot light are easy visual indicators for the user to use in locating the correct item.

FIG. 7 also shows that the method 700 can include the user removing 712 the indicated item of ophthalmic lenses. The user opens the drawer indicated by the drawer light and then removes 712 the item in the slot indicated by the slot light. The configuration of horizontal and vertical dividers is critical to allow the user to easily remove the items, as described above.

FIG. 7 further shows that the method 700 can include the user scanning 714 the removed 712 item. The user scans 714 the removed 712 item using an optical scanner, as described above. The item is scanned because items next to each other may be very different from one another, so a check needs to be performed to make sure that the user retrieved the correct item. For example, the user may have inadvertently grabbed an item from an adjoining slot.

FIG. 7 additionally shows that the method 700 can include the inventory management system determining 716 whether the scanned 714 item matches the selected 704 item. I.e., whether the item which the user has physically removed from the cabinet is the item which was intended. Sometimes the user will select an item from the wrong slot because he/she is hurrying or otherwise makes a mistake, so double checking is imperative. The inventory management system compares the scanned 714 item to ensure that the barcode of the scanned item and the selected 704 item are the same. I.e., the system checks to ensure that the user has the desired item.

FIG. 7 moreover shows that the method 700 can include removing 718 the item from the inventory list if the scanned 714 item matches the selected 704 item. Since the desired item has been removed from the automated cabinet, the inventory is updated to reflect the corrected inventory. For example, the inventory can reflect that the package has been removed or that the package contains fewer ophthalmic lenses (for example, if part of a package is being used-so the inventory will reflect that only a portion of the ophthalmic lenses in the original package are still available).

FIG. 7 also shows that the method 700 can include turning off 720 the drawer and slot light once the item has been removed 718 from the inventory list. The user no longer needs the visual indicator so the lights are turned off 720 so that other items can be selected and removed using the same process.

FIG. 7 further shows that the method 700 can include asking the user to confirm 722 that the user removed the item from the correct slot if the scanned 714 item does not match the selected 704 item. Most or all mismatches will be due to user error (selecting an item from the wrong slot) so the user is first asked to double check the selection. The user will check the slot (which is still indicated by the drawer light and the slot light) to make sure that the item from the correct slot was removed. If an adjoining item was removed, then the user can correct the mistake and return the incorrect item and rescan 714 the item from the correct slot.

FIG. 7 additionally shows that the method 700 can include having the user place 724 the selected item in a restock bin if the user did select the item from the correct slot. If the user took the item from the correct slot, then the error was in the inventory list (usually a user error in placing the item during stocking) and the item will need to be restocked at a later time. Therefore, the incorrect item is placed in a restock bin so that it can be stocked and inventoried at a later time.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 8 is a flowchart illustrating a method 800 of stocking items in a system 100 for product storage and inventory management. The item can include any desired item stored within the automated cabinet, such as a package of ophthalmic lenses. In at least one implementation, the ophthalmic lenses are obtained from a system for product storage and management, such as the system 100 of FIGS. 1-6. Therefore, the method 800 will be described, exemplarily, with reference to the system 100 of FIGS. 1-6. Nevertheless, one of skill in the art can appreciate that the method 800 can be used with systems other than the system 100 of FIGS. 1-6. The method can be implemented in software or any other desired medium.

FIG. 8 shows that the method 800 can include scanning 802 the item to be stocked. The user scans 802 the item to be stocked using an optical scanner, as described above. The item is scanned 802 to give a reference for when the item is later being removed. The item is scanned 802 when being added to the automated cabinet so that when it is removed it can be scanned to ensure that the correct item is being removed. In addition, scanning 802 the item can be used obtain information about the item as described below.

FIG. 8 also shows that the method 800 can include obtaining 804 information about the item. Information is obtained 804 about the item so that a user can later find the item, either as a part of a list or a search. One of skill in the art will understand that for some items, scanning 802 will allow the system to obtain the information over a network, such as the Internet but for other items, information may need to be entered manually. Information that is obtained 804 can be any information that will later be desired by a user. For example, for ophthalmic lenses it can include prescription, lens type, brand, manufacturer, wear regimen (daily, weekly, bi-weekly, monthly, etc.), etc.

FIG. 8 further shows that the method 800 can include the inventory management system identifying 806 the drawer and slot where the item is to be stored. This will allow the inventory management system to direct the user to the slot where the item should be stored. There are already items within the automated cabinet and potentially thousands of slots, which may be of different sizes. No sorting is necessary in the automated cabinet because the user will be directed to the correct storage location when the item needs to be retrieved. The slot can be selected based on characteristics of the item. For example, a slot for ophthalmic lenses can be selected based on size of the package.

FIG. 8 additionally shows that the method 800 can include the inventory management system sending 808 a signal to the PCB associated with the drawer where the item is to be stored indicating the slot where the item is to be stored. This is an electronic signal sent to the PCB so that the user can be quickly directed to the correct location without any requirements by the user to locate the slot manually.

FIG. 8 moreover shows that the method 800 can include the PCB associated with the drawer where the item is to be stored turning on 810 the drawer light and the slot lights of the slot where the item is to be stored. The drawer light and the slot light quickly direct the user to the slot where the item is to be stored. The drawer light and slot light are easy visual indicators for the user to use in locating the correct slot for storage of the item.

FIG. 8 also shows that the method 800 can include the user placing 812 the indicated item in the indicated slot. The user opens the drawer indicated by the drawer light and then places 812 the item in the slot indicated by the slot light. The configuration of horizontal and vertical dividers is critical to allow the user to easily place the items, as described above.

FIG. 8 moreover shows that the method 800 can include adding 814 the item to the inventory list. Now that the item has been added to the automated cabinet, the inventory is updated to reflect that the item is now available for later retrieval. This allows a later user to find the item and then remove it from the automated cabinet when needed.

FIG. 8 also shows that the method 800 can include turning off 816 the drawer and slot light once the item has been added 814 to the inventory list. The user no longer needs the visual indicator so the lights are turned off 816 so that other items can be added to the automated cabinet or removed as described above.

FIG. 9, and the following discussion, are intended to provide a brief, general description of a suitable computing environment in which the invention may be implemented. Although not required, the invention will be described in the general context of computer executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One of skill in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 9, an example system for implementing the invention includes a general purpose computing device in the form of a conventional computer 920, including a processing unit 921, a system memory 922, and a system bus 923 that couples various system components including the system memory 922 to the processing unit 921. It should be noted however, that as mobile phones become more sophisticated, mobile phones are beginning to incorporate many of the components illustrated for conventional computer 920. Accordingly, with relatively minor adjustments, mostly with respect to input/output devices, the description of conventional computer 920 applies equally to mobile phones. The system bus 923 may be any of several types of bus structures including a memory bus or memory controller, a peripheral bus, and a local bus using any of a variety of bus architectures. The system memory includes read only memory (ROM) 924 and random access memory (RAM) 925. A basic input/output system (BIOS) 926, containing the basic routines that help transfer information between elements within the computer 920, such as during start-up, may be stored in ROM 924.

The computer 920 may also include a magnetic hard disk drive 927 for reading from and writing to a magnetic hard disk 939, a magnetic disk drive 928 for reading from or writing to a removable magnetic disk 929, and an optical disc drive 930 for reading from or writing to removable optical disc 931 such as a CD ROM or other optical media. The magnetic hard disk drive 927, magnetic disk drive 928, and optical disc drive 930 are connected to the system bus 923 by a hard disk drive interface 932, a magnetic disk drive-interface 933, and an optical drive interface 934, respectively. The drives and their associated computer-readable media provide nonvolatile storage of computer-executable instructions, data structures, program modules, and other data for the computer 920. Although the exemplary environment described herein employs a magnetic hard disk 939, a removable magnetic disk 929, and a removable optical disc 931, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 939, magnetic disk 929, optical disc 931, ROM 924, or RAM 925, including an operating system 935, one or more application programs 936, other program modules 937, and program data 938. A user may enter commands and information into the computer 920 through keyboard 940, pointing device 942, or other input devices (not shown), such as a microphone, joy stick, game pad, satellite dish, scanner, motion detectors, or the like. These and other input devices are often connected to the processing unit 921 through a serial port interface 946 coupled to system bus 923. Alternatively, the input devices may be connected by other interfaces, such as a parallel port, a game port or a universal serial bus (USB). A monitor 947 or another display device is also connected to system bus 923 via an interface, such as video adapter 948. In addition to the monitor, personal computers typically include other peripheral output devices (not shown), such as speakers and printers.

The computer 920 may operate in a networked environment using logical connections to one or more remote computers, such as remote computers 949a and 949b. Remote computers 949a and 949b may each be another personal computer, a server, a router, a network PC, a peer device, or other common network node, and typically include many or all of the elements described above relative to the computer 920, although only memory storage devices 950a and 950b and their associated application programs 936a and 936b have been illustrated in FIG. 9. The logical connections depicted in FIG. 9 include a local area network (LAN) 951 and a wide area network (WAN) 952 that are presented here by way of example and not limitation. Such networking environments are commonplace in office-wide or enterprise-wide computer networks, intranets, and the Internet.

When used in a LAN networking environment, the computer 920 can be connected to the local network 951 through a network interface or adapter 953. When used in a WAN networking environment, the computer 920 may include a modem 954, a wireless link, or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing communications over wide area network 952 may be used.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An automated cabinet, the automated cabinet comprising:
   an inventory management system, the inventory management system including:
      a controller, the controller comprising a processor and a memory, the memory having computer-executable instructions stored thereon that, when executed by the processor, cause the controller to:
      keep an inventory of a storage cabinet;
      send and receive electrical communications to and from the storage cabinet;
   the storage cabinet, the storage cabinet including:
      a housing;
      one or more drawers configured to be slidably stowable within the housing, each of the one or more drawers:
         defining a storage area configured to receive a product; including:
         a base;
         a series of horizontal dividers, wherein each horizontal divider of the series of horizontal dividers is:
            aligned side to side within the drawer; and
            is placed on the base of the drawer;
         a series of vertical dividers, wherein each vertical divider of the series of vertical dividers:
            is aligned front to back within the drawer;
            rests on one or more of the horizontal dividers of the series of horizontal dividers; and mated with one or more of the horizontal dividers of the series of horizontal dividers, creating one or more configurable slots within the drawer, wherein a width of the one or more configurable slots can be changed by moving one or more of the vertical dividers of the series of vertical dividers;

one or more printed circuit boards, wherein each printed circuit board of the one or more printed circuit boards:
is in electronic communication with the inventory management system; and
electronically connected to:
a drawer light in each drawer of the one or more drawers; and
one or more slot lights, wherein the one or more slot lights are configured to indicate respective positions of the one or more configurable slots created by the series of horizontal dividers and the one or more series of vertical dividers within the drawer;
one or more communication wires, each communication wire carrying an electrical communication between one of the printed circuit boards and the electronically connected drawer light in each drawer of the one or more drawers and one or more slot lights;
the one or more communication wires passing through the back of the one or more drawers;
a wire regulator connecting the one or more communication wires:
the wire regulator including a spring for regulating the wires.

2. The automated cabinet of claim 1, wherein each horizontal divider includes: a base; and a series of knobs protruding vertically from the base.

3. The automated cabinet of claim 2, wherein each knob of the series of knobs are approximately 0.574 inches wide.

4. The automated cabinet of claim 3, wherein distance between adjoining knobs is approximately 0.596 inches.

5. The automated cabinet of claim 2, wherein each knob of the series are knobs are rounded.

6. The automated cabinet of claim 2, wherein each knob of the series of knobs are each approximately 0.75 inches tall.

7. The automated cabinet of claim 2, wherein the base is approximately 0.75 inches tall.

8. The automated cabinet of claim 1, wherein each horizontal divider is 24-gauge sheet metal.

9. The automated cabinet of claim 1, wherein each vertical divider includes a series of channels.

10. The automated cabinet of claim 9, wherein the channels are approximately 0.039 inches wide.

11. The automated cabinet of claim 9, wherein a distance between adjacent channels is approximately 0.617 inches.

12. An automated cabinet, the automated cabinet comprising:
an inventory management system, the inventory management system including:
a controller, the controller comprising a processor and a memory, the memory having computer-executable instructions stored thereon that, when executed by the processor, cause the controller to:
keep an inventory of a storage cabinet;
send and receive electrical communications to and from the storage cabinet;
the storage cabinet, the storage cabinet including:
a housing;
one or more drawers configured to be slidably stowable within the housing, each of the one or more drawers:
defining a storage area configured to receive a product; and including:
a base;
a series of horizontal dividers, wherein each horizontal divider of the series of horizontal dividers:
is aligned side to side within the drawer;
is placed on the base of the drawer; and
includes:
a base; and
a series of knobs protruding vertically from the base;
a series of vertical dividers, wherein each vertical divider of the series of vertical dividers:
is aligned front to back within the drawer;
rests on one or more of the horizontal dividers of the series of horizontal dividers between two adjacent knobs in the series of knobs; and
mated with one or more horizontal dividers of the series of horizontal dividers, creating one or more slots within the drawer;
one or more printed circuit boards, wherein each printed circuit board of the one or more printed circuit boards:
is in electronic communication with the inventory management system; and
electronically connected to:
a drawer light in each drawer of the one or more drawers; and
one or more slot lights, wherein the one or more slot lights are configured to indicate respective positions of the one or more slots created by the series of horizontal dividers and the series of vertical dividers within the drawer;
one or more communication wires, each communication wire carrying an electrical communication between one of the printed circuit boards and the electronically connected drawer light in each drawer of the one or more drawers and one or more slot lights;
the one or more communication wires passing through the back of the one or more drawers;
a wire regulator connecting the one or more communication wires:
the wire regulator including a spring for regulating the wires.

13. The automated cabinet of claim 12, wherein the wire regulator includes a wire holder having a pulley.

14. An automated cabinet, the automated cabinet comprising:
an inventory management system, the inventory management system including:
a controller, the controller comprising a processor and a memory, the memory having computer-executable instructions stored thereon that, when executed by the processor, cause the controller to:
keep an inventory of a storage cabinet; and
send and receive electrical communications to and from the storage cabinet;
the storage cabinet, the storage cabinet including:
a housing;
one or more drawers configured to be slidably stowable within the housing, each of the one or more drawers:
defining a storage area configured to receive a product; and including:
a base;

a back edge;
a series of horizontal dividers, wherein each horizontal divider of the series of horizontal dividers:
 is aligned side to side within the drawer;
 is placed on the base of the drawer; and
 includes:
 a base; and
 a series of knobs protruding vertically from the base;
a series of vertical dividers, wherein each vertical divider of the series of vertical dividers:
 is aligned front to back within the drawer;
 rests on one or more of the horizontal dividers of the series of horizontal dividers between two adjacent knobs in the series of knobs; and
 mated with one or more horizontal dividers of the series of horizontal dividers creating one or more slots within the drawer, wherein:
 a width of the one or more slots can be changed by moving one of the one or more of the vertical dividers of the series of vertical dividers and
 a depth of the one or more slots can be changed by moving one of the one or more of the horizontal dividers of the series of horizontal dividers; a series of channels, wherein the series of channels:
 are on the bottom of the vertical dividers; and
 allows one of the horizontal dividers of the series of horizontal dividers to at least partially pass through a vertical divider of the series of vertical dividers; and
 a light strip mounted on the vertical divider, wherein each light on the light strip is placed between adjacent channels;
one or more printed circuit boards, wherein each printed circuit board of the one or more printed circuit boards:
 is in electronic communication with the inventory management system; and
 electronically connected to:
  a drawer light in each drawer of the one or more drawers; and
  the light strips on each of the vertical dividers;
 one or more communication wires, each communication wire:
  carrying an electrical communication between one of the printed circuit boards and the electronically connected drawer light in each drawer of the one or more drawers and the light strips; and
  passing through a back of one of the one or more drawers;
 a wire regulator for each of the one or more communication wires, wherein the wire regulator:
  is between the back edge of one of the drawers of the one or more drawers and the housing of the storage cabinet; and
  includes:
   a wire holder, wherein the wire holder is connected to one of the one or more communication wires;
   an attachment point, wherein the attachment point is a set point on the back edge of one of the one or more drawers; and
   a spring connected to the wire holder and the attachment point.

15. The automated cabinet of claim 14, wherein the inventory is searchable by prescription, wherein the user can input: a spectacle prescription and the spectacle prescription will be converted to a contact lens prescription via standard vertex conversion via standard vertex conversion calculation and the contact lens prescription will be included in the search results.

16. The automated cabinet of claim 14, wherein the inventory is searchable by manufacturer.

17. The automated cabinet of claim 14, wherein the inventory is searchable by brand.

18. The automated cabinet of claim 14, wherein the inventory is searchable by wear regimen.

\* \* \* \* \*